Nov. 5, 1968  G. BJORNSON ET AL  3,409,403
PLASMA PREPARATION OF CARBON BLACK
Filed Oct. 5, 1964
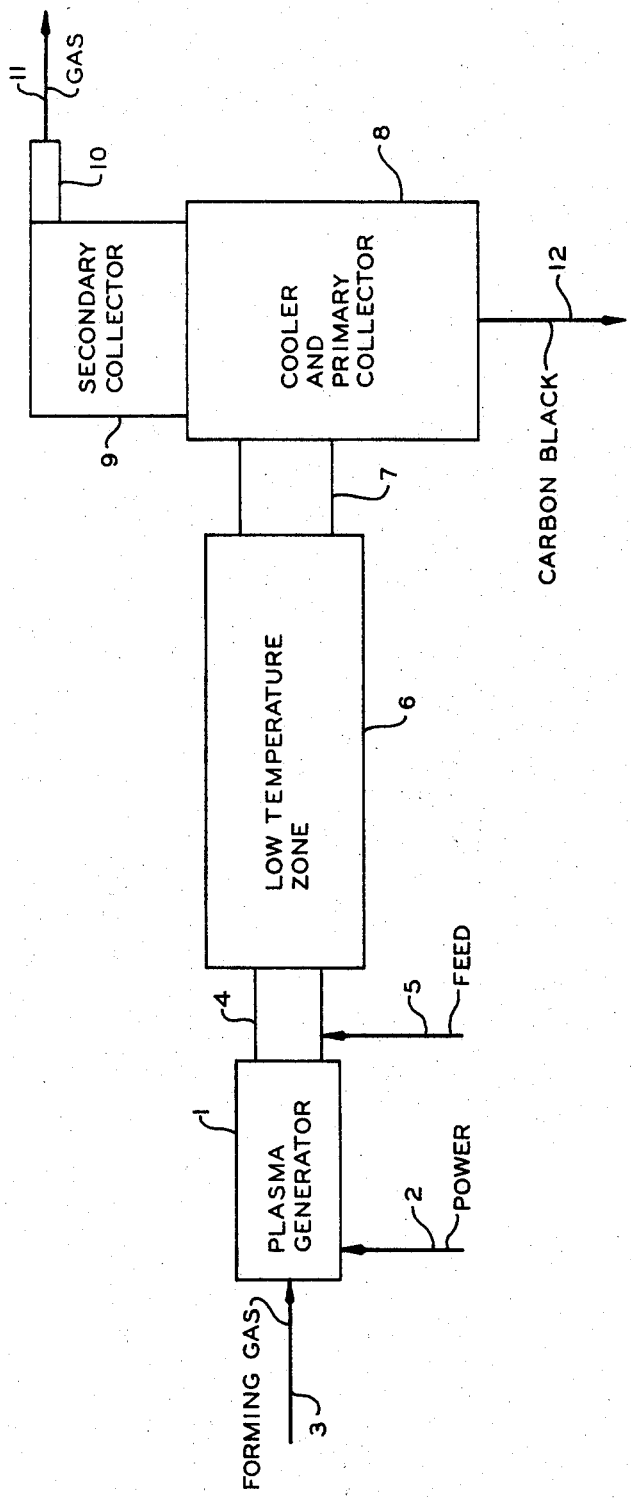
INVENTORS
GEIR BJORNSON
H.M. FOX
BY Young & Quigg
ATTORNEYS

United States Patent Office 3,409,403
Patented Nov. 5, 1968

3,409,403
PLASMA PREPARATION OF CARBON BLACK
Geir Bjornson and Homer M. Fox, Bartlesville, Okla., assignors to Phillips Petroleum Company, a corporation of Delaware
Filed Oct. 5, 1964, Ser. No. 401,425
3 Claims. (Cl. 23—209.3)

ABSTRACT OF THE DISCLOSURE

A process for the production of high-structure carbon black in which the hydrocarbon feed is passed into a plasma reaction zone for an effective length of time. The effluent from the plasma zone is then passed into a second intermediate zone where it is maintained at a lower temperature for an effective length of time. The effluent from said second zone is then passed to a cooler and/or separator zone where the high-structure carbon black is removed as a product of the process.

---

This invention relates to a method and apparatus for producing carbon black.

Heretofore the conventional methods of producing carbon black have utilized to varying, and sometimes quite significant, degrees a part of the hydrocarbon feed to provide the thermal energy necessary to decompose the remainder of the hydrocarbon feed to the desired carbon black product. Thus, by these methods hydrocarbon feed is inefficiently converted to carbon black.

Also heretofore, plasmas have been utilized to form carbon black. Generally, the hydrocarbon stream after contacting the plasma is quenched or held at the temperature of the plasma for a longer period of time than is necessary to effect decomposition. Such methods suffer from the problem that the carbon black product varies as to type and quality and is not generally predictable as to composition.

It has now been found that a high-quality, high-structure carbon black can be consistently prepared by a process which converts the hydrocarbon feed substantially completely into carbon black by providing two zones in a plasma heating reactor. In the reactor a hydrocarbon feed is exposed in a first zone to the very high temperatures of the plasma and then, before quenching, is maintained for a somewhat longer period of time in a second zone which is at a temperature lower than that of the first zone. By this method there is realized an increased yield of carbon black per unit of feed since substantially all of the hydrocarbon feed is utilized to form carbon black and is not consumed to provide thermal energy to decompose the feed. Furthermore, the only products of this invention are a high-structure carbon black and a substantially pure stream of gas which can be utilized to form the plasma.

Accordingly, it is an object of this invention to provide an improved method and apparatus for the preparation of high-structure carbon black. It is yet another object of this invention to produce a high-structure carbon black.

Other aspects, objects and the several advantages of the invention are apparent from a study of this disclosure, the drawing and the appended claims.

According to this invention a hydrocarbon feed (hereinafter defined) is thermally converted to a high-structure carbon black by first decomposing the feed by heating same with a plasma having a temperature of at least about 3000° C. This step produces a stream of hydrocarbon decomposition products which is then given a relatively long residence time in a downstream carbon formation zone maintained at about 800° C. High-structure carbon black and plasma-forming gas are recovered as essentially the sole products of the process.

Feed hydrocarbons which are applicable to this process can be any hydrocarbon which will form a substantial quantity of acetylene upon decomposition at elevated temperatures, i.e. at least 2100° C. Paraffins, both iso and normal, are generally preferred and the lower paraffins which contain from one to eight carbon atoms per molecule, e.g. methane, ethane, propane, isopentane and the like, are particularly useful because of convenience, availability and economics.

Although the theoretical aspects of the present invention are not completely understood, it is believed that beneficial effects are obtained when the acetylene, which is initially formed and which is thermodynamically stable at temperatures above 3000° C., is allowed to decompose to hydrogen and carbon black by delaying the quenching of the hot stream and by providing an adequate opportunity (residence time) for the acetylene to decompose at lower temperatures, i.e. about 800° C., where it is considerably less stable. Rapid quenching of the stream, on the other hand, decreases the residence time in the temperature range in which acetylene decomposes readily and prevents its conversion to carbon black having the desired high structure properties.

The drawing shows diagrammatically a system embodying the invention.

According to the drawing, a plasma generator 1 powered by any known and suitable power source 2 and operating on a plasma-forming gas supplied by line 3 creates a high temperature zone 4, i.e. at least 3,000° C., into which zone is fed a hydrocarbon feed by means of line 5. In the high temperature plasma zone 4 the initial decomposition of the hydrocarbon feed is achieved. The point of feed introduction can vary with the type of plasma generator used but generally will be in close proximity to the point of plasma generation. For example, when an arc plasma generator is used, it is frequently convenient to inject the feed through an aperture in the anode of the generator.

The effluent from said high temperature zone 4 then passes to low temperature zone 6 which zone is adjusted in physical extent relative to the speed of material passing therethrough to provide a downstream carbon formation zone of elevated temperature but of a temperature lower than that present in high temperature zone 4. After a relatively long residence time compared to the residence time experienced in high temperature zone 4, the material in low temperature zone 6 is passed by conduit 7 to a cooler and/or primary collector 8.

Depending upon the temperature of the plasma at the point of feed introduction, the residence time of the hydrocarbon will be in the range of from about one to about ten milliseconds. For example, a zone containing plasma at about 9000° C. requires a residence time of about 5 milliseconds. The stream of plasma particles, plasma-forming gas, acetylene, and minor amounts of other decomposition products is then conducted to a zone wherein the temperature of that stream can be maintained at about 800° C. for a substantially longer period of time. Satisfactory results can be obtained by maintaining this stream at a temperature of about 400–2000° C., preferably about 600–1000° C., for about 0.01–2, preferably 0.1, second.

The products of zone 8 which primarily include high structure carbon black and plasma-forming gas pass to a conventional secondary collecting zone 9 for removal of tenaciously entrained carbon black from said gas. The gas is then passed through vent 10 and line 11 to further processing, storage, recycling to plasma-forming gas feed line 3 or any other desired disposition. The high-structure carbon black produced by the process is removed from zone 8 by line 12 for further treatment, storage and the like.

The essential parts of the process comprise a plasma generator, a high temperature zone, a low temperature zone, and a product recovery system. The illustration is not intended to be limiting, and other variations and embodiments utilizing these features are also to be considered part of the invention. For example, conventional techniques can be employed to recover heat from the hot zones which can then be used to preheat the hydrocarbon feed and/or the plasma-forming gas. When hydrogen is used as the plasma-forming gas, a portion of the gas stream from the recovery stage of the process can be recycled as feed, to the plasma generator. Also, conventional cooling, separating and carbon black collecting systems can be employed in this invention. Other such improvements which are obvious to those skilled in the art may also be included without departing from the spirit of this invention.

A hydrogen plasma is preferred for use in this inventive process although plasmas from other inert gases such as nitrogen, argon and the like can be used if desired. Hydrogen has the inherent advantage of high thermal efficiency to plasma besides the fact that it does not contaminate the normal products and thus avoids costly separations.

The plasma can be generated by any conventionally known device such as an arc plasma generator, an induction plasma generator, or the like. In general, any device which will provide a plasma-containing stream of gas having a temperature in the range of 3000–20,000° C. or even higher can be utilized in this invention.

Because of the high temperatures involved in the process, the materials of construction of the apparatus involved must be such that they will withstand the temperature without decomposing into materials which will eventually contaminate the valuable products of the invention. Such resistant materials are known. High-grade refractory oxides, graphite, and various metal alloys can be used. It should be pointed out that despite the high temperatures involved the generally inert nature of the materials passing through the apparatus somewhat simplifies the problem of suitable materials of construction. Suitable plasma flame generators that can be employed are disclosed in U.S. Patents 2,960,594, Thorpe, issued Nov. 15, 1960, and 2,922,869, Giannini et al., issued Jan. 26, 1960.

EXAMPLE I

A plasma arc torch (Plasmadyne Model SG–1 head, water cooled, 5/16-inch orifice, copper anode and thoriated tungsten cathode) was mounted so as to discharge into a 2-inch inside diameter alundum tube which was concentrically encased in an 8-inch diameter metal shell. The annular void between the tube and the shell was left empty. This tube section was 4 feet long. The alundum tube, in turn, discharged into a 12-inch by 24-inch long expansion vessel having a glass cloth catch bag mounted at the discharge at the top of this vessel.

Operating at 225–250 amperes, 92–100 volts, 1.04 standard cubic feet per minute of nitrogen arc gas, and 0.53 standard cubic foot per minute of propane introduced into the system through an aperture in the anode, the process was carried out for 9 minutes and 50 seconds. A total of 45.3 grams of black was recovered from both the receiving vessel and the bag (some mechanical losses were experienced). In the high temperature zone in the region of the anode, the propane was contacted with plasma having an average temperature of about 9000° C. for a period of about 5 milliseconds. In the 2-inch tube the stream was maintained at an average temperature of about 800° C. with a residence time of about 0.1 second.

The carbon black obtained from the receiving vessel was examined and the results are shown in the table below.

Table A

Feed Stock: Propane [1]
Oil absorption, cc./g. _____ 3.01
$N_2$ surface area, m.$^2$/g. _____ 94
pH _____ 5.4
Carbon, percent [2] _____ 98.1
Hydrogen, percent _____ 0.61
Oxygen, percent _____ 0.35
Nitrogen, percent _____ 0.62
Sulfur, percent _____ 0.00
Volatiles, percent _____ 2.72
Ash, percent _____ 0.43

[1] The carbon black had 0.96 weight percent benzene extractables. Properties of propane blacks determined on extracted samples.
[2] All percentages by weight.

It can be seen from the data in the table above that the high values for oil absorption indicate a high-structure carbon black was formed. A similar run using hydrogen as the plasma-producing gas produces essentially the same results.

EXAMPLE II

To illustrate that rapid quenching of a plasma-treated hydrocarbon stream does not produce the same results, the following run was carried out. Under essentially the same conditions as those described in the preceding example, methane was introduced to a nitrogen plasma at the anode. The resulting stream was then discharged immediately from the high temperature plasma zone into a 1-inch inside diameter ambient temperature, water-cooled section which was followed by a collecting system consisting of a cyclone and a Cottrell precipitator. The results of the examination of the carbon black prepared in this manner are shown in the following table.

Table B

Feed stock (Type Collection): Methane (Cyclone)
Oil absorption, cc./g. _____ 1.78
$N_2$ surface area, m.$^2$/g. _____ 318
pH _____ 9.2
Benzene extractable, percent _____ 7.13
Carbon, percent _____ 94.9
Hydrogen, percent _____ 0.90
Oxygen, percent _____ 1.0
Nitrogen, percent _____ 0.25
Sulfur, percent _____ 0.00
Volatiles, percent _____ 0.32
Ash, percent _____ 0.23

Examination of these data demonstrates that failure to delay quenching and to provide a zone wherein the primary decomposition products can further decompose to the desired end products of this invention results in a carbon black which indicates, by its lower oil absorption value, a lower structure carbon black.

EXAMPLE III

The high-structure black made in Example I by a nitrogen plasma using propane feed stock was further tested. The following is a comparison of the invention carbon black with a commercial ultra-high structure black (Shawinigan acetylene black) in a conventional rubber tire tread type recipe.

The following table compares the physical-chemical properties of these two high structure blacks.

Table C

| Black Number | Oil Absorption, cc./gm. | $N_2$ Surface Area, m$^2$/gm. | pH | ASTM Volatile, Percent | Benzene Extractables, Percent | Ultimate Analysis, Percent | | | |
|---|---|---|---|---|---|---|---|---|---|
| | | | | | | $H_2$ | $N_2$ | $O_2$ | C |
| Plasma Black | 3.01 | 94 | 5.4 | 2.72 | 0.96 | 0.61 | 0.62 | 0.35 | 98.1 |
| Acetylene | 2.12 | 65 | 5.7 | 0.64 | 0.11 | 0.09 | | 0.08 | 99.8 |

Stocks utilizing these two blacks were compounded on a 2-inch roll mill in the following recipe:

| | Parts by weight per 100 parts rubber |
|---|---|
| Philprene 1500 [1] | 100 |
| Black (non-extracted) | 50 |
| Philrich 5 [2] | 10 |
| Zinc oxide | 3 |
| Stearic acid | 1 |
| Flexamine [3] | 1 |
| Sulfur | 1.75 |
| Santocure [4] | 1.3 |

[1] A styrene-butadiene copolymer containing about 23.5 styrene, emulsion polymerized at about 41° F. using a rosin-acid soap.
[2] Aromatic petroleum oil, extender and plasticizer.
[3] 65% diarylamine-ketone reaction product and 35% N,N'-diphenyl-p-phenylenediamine.
[4] n-Cyclohexyl-2-benzothiazole sulfenamide accelerator.

Slabs were cured 30 minutes at 307° F. and pellets 40 minutes at 307° F. The cured rubber was tested with the following results.

Table D

| Black | Physical Properties of SBR 1500 Vulcanizates | | | | | |
|---|---|---|---|---|---|---|
| | 300% Modulus, p.s.i. | Tensile, p.s.i. | Elongation, Percent | Shore Hardness | $\Delta T$, ° F. | Resilience, Percent |
| Plasma Black | 1,840 | 2,250 | 380 | 68 | 77.5 | 60.8 |
| Acetylene | 1,220 | 2,100 | 550 | 63 | 73.8 | 59.3 |

Table D shows the physical properties of the styrene-butadiene vulcanizates. The plasma black gave higher modulus, shorter elongation and a harder stock than the acetylene black control. Tensile was equal to the control and heat build-up was held to a tolerable increase. Other utility of the product of this invention is found in its use in extrusion formulations to make extruded rubber, insulated material and the like.

The above rubber properties indicate that the high "structure" of the black of this invention is actual. The high value for the 300% modulus property of the plasma black is indicative of a reinforcing black having a high structure. The plasma black reinforced rubber is seen to have an even higher modulus than that of the specimen using the commercial high-structure carbon black.

By the terms "structure" and "high structure" it is meant the tendency of carbon particles to agglomerate. A low structure carbon black contains, largely, monodisperse particles. A high-structure carbon black contains, largely, particles which have agglomerated, usually in chain-type configurations. Structure is commonly determined by measuring the quantity of mineral oil required to permit a weighed amount of carbon black tube worked into a single coherent ball. The structure, in cubic centimeters/gram, can vary from about 0.1 for some conventional furnace blacks to about 2.5 or higher for conventional acetylene blacks.

The structure of a carbon black is important in that it influences the processing behavior of reinforced rubber stocks and the properties of the finished rubber product properties. Consequently, carbon black structure is a variable which must be considered with each rubber application.

Reasonable variations and modifications are possible within the scope of this disclosure without departing from the spirit and scope of the invention.

We claim:

1. A process for the preparation of a high-structure carbon black comprising reacting a normal or isoparaffin having 1–8 carbon atoms per molecule with a plasma-forming gas at a temperature above 3000° C. for a time of about 1 to 10 milliseconds, thereby forming acetylene; maintaining the resulting effluent at an average temperature of about 600° C. to 1000° C. for a time of 0.01 to 2 seconds, thereby decomposing said acetylene to said carbon black and hydrogen; then cooling the carbon black containing stream to a temperature which allows the separation of said carbon black from said hydrogen; and recovering therefrom said carbon black.

2. The process of claim 1 wherein said normal or isoparaffin is reacted at a temperature of about 9000° C. for a time of about 5 milliseconds; and said resulting effluent is maintained at an average temperature of about 800° C. for a time of about 0.1 second.

3. The process of claim 2 wherein the said normal or isoparaffin is propane.

References Cited

UNITED STATES PATENTS

| 3,009,783 | 11/1961 | Sheer et al. | 23—209.3 |
| 3,288,696 | 11/1966 | Orbach | 204—173 |
| 3,342,554 | 9/1967 | Jordan et al. | 23—209.2 |

FOREIGN PATENTS

| 593,612 | 3/1960 | Canada. |

EDWARD J. MEROS, *Primary Examiner.*